United States Patent
Tirpak

(10) Patent No.: US 10,674,211 B2
(45) Date of Patent: Jun. 2, 2020

(54) DETECTING ILLICIT VIEWING OF PREMIUM CONTENT THROUGH LOCATION DETECTION BY A TELEVISION RECEIVER DEVICE

(71) Applicant: DISH Technologies L.L.C., Englewood, CO (US)

(72) Inventor: Christopher Boyd Tirpak, Monument, CO (US)

(73) Assignee: Dish Technologies L.L.C., Englewood, CO (US)

( * ) Notice: Subject to any disclaimer, the term of this patent is extended or adjusted under 35 U.S.C. 154(b) by 0 days.

(21) Appl. No.: 15/859,450

(22) Filed: Dec. 30, 2017

(65) Prior Publication Data

US 2018/0220192 A1    Aug. 2, 2018

Related U.S. Application Data

(60) Provisional application No. 62/441,136, filed on Dec. 30, 2016.

(51) Int. Cl.
| | | |
|---|---|---|
| *H04N 21/45* | (2011.01) | |
| *H04N 21/442* | (2011.01) | |
| *H04N 21/4363* | (2011.01) | |
| *H04N 21/4627* | (2011.01) | |

(52) U.S. Cl.
CPC ... *H04N 21/4524* (2013.01); *H04N 21/43637* (2013.01); *H04N 21/44227* (2013.01); *H04N 21/4627* (2013.01)

(58) Field of Classification Search
CPC ......... H04N 21/4524; H04N 21/43637; H04N 21/44227; H04N 21/4627
See application file for complete search history.

(56) References Cited

U.S. PATENT DOCUMENTS

| | | | | |
|---|---|---|---|---|
| 7,305,245 | B2 * | 12/2007 | Alizadeh-Shabdiz | .... G01S 5/02 340/572.4 |
| 8,666,434 | B1 * | 3/2014 | Taylor | ..................... G01S 19/39 455/404.2 |
| 2006/0036517 | A1 * | 2/2006 | Walter | ................. G06Q 10/087 705/29 |
| 2009/0109870 | A1 * | 4/2009 | Metke | ..................... H04L 45/46 370/254 |
| 2010/0208740 | A1 | 8/2010 | Furutani | |
| 2010/0325649 | A1 * | 12/2010 | Anguiano | .......... H04N 21/2541 725/25 |
| 2013/0190018 | A1 * | 7/2013 | Mathews | ............... H04W 4/023 455/456.6 |

(Continued)

*Primary Examiner* — Pinkal R Chokshi
(74) *Attorney, Agent, or Firm* — Lorenz & Kopf LLP

(57) ABSTRACT

A television set top box (STB) or similar receiver device uses information obtained from a wireless interface to automatically detect when the device has been moved to a different location. The device may initially obtain a list of wi-fi zones or in-range wireless devices that can be quantified or stored for later comparison. If the device later finds that the original zones/devices are no longer present or that substantial numbers of new zones/devices are present, then the device can recognize that it has been moved to a new location. The device may respond to the detected location change by disabling premium content, by reporting back to a security service, by simply recording the change in location, or by taking other actions as appropriate.

18 Claims, 2 Drawing Sheets

(56) References Cited

U.S. PATENT DOCUMENTS

Figure 1:
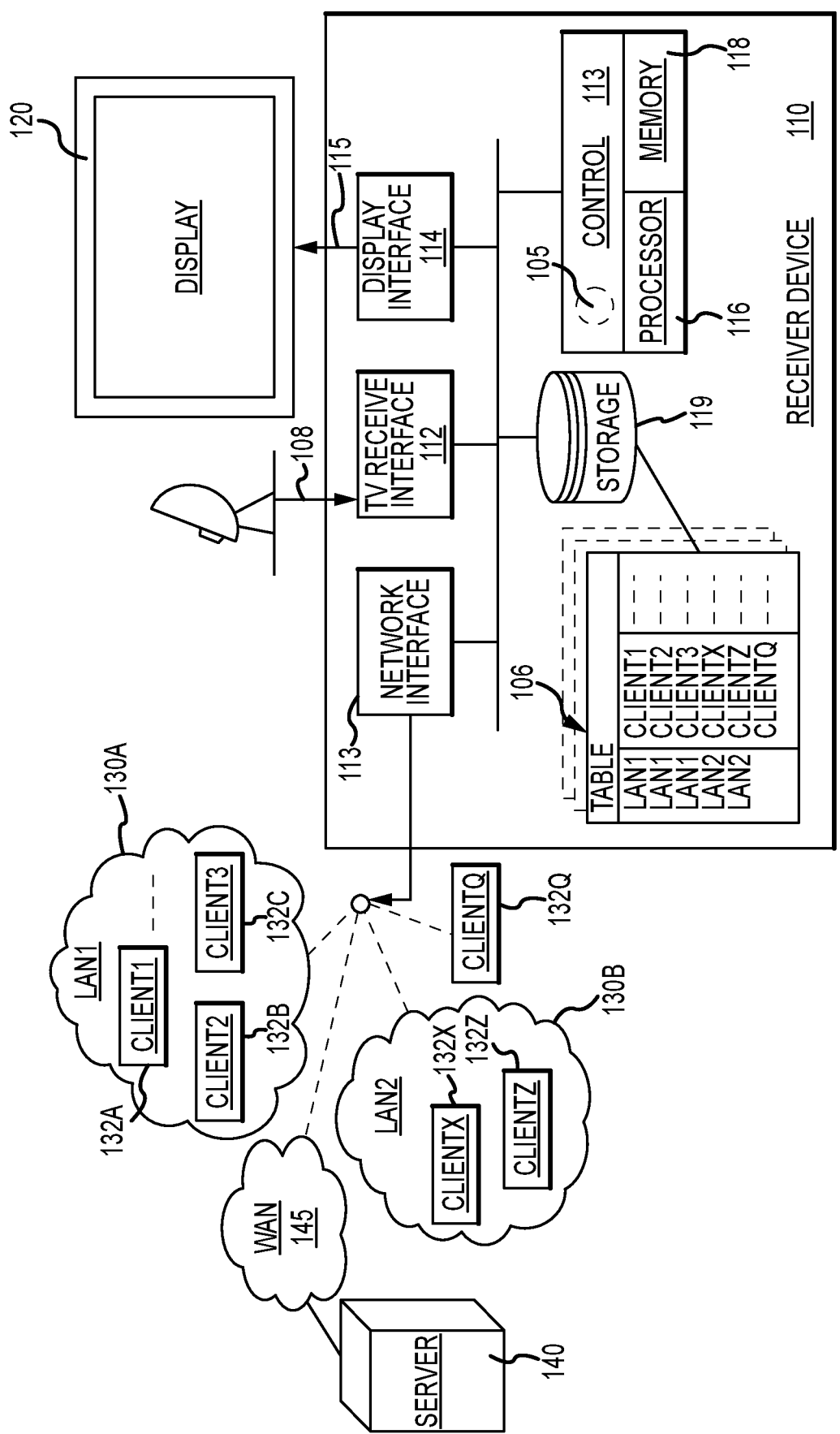

| | | | | |
|---|---|---|---|---|
| 2013/0276017 A1* | 10/2013 | Walker | ............ | H04N 21/44204 |
| | | | | 725/25 |
| 2013/0326554 A1* | 12/2013 | Shkedi | ................ | H04N 21/812 |
| | | | | 725/34 |
| 2014/0330945 A1* | 11/2014 | Dabbiere | ............ | H04L 41/0843 |
| | | | | 709/220 |
| 2015/0365787 A1* | 12/2015 | Farrell | .................... | H04W 4/02 |
| | | | | 455/456.1 |
| 2016/0029169 A1* | 1/2016 | Nichols | ................ | H04L 67/306 |
| | | | | 455/456.3 |
| 2016/0105626 A1* | 4/2016 | McRae | .................... | H04N 5/44 |
| | | | | 348/554 |
| 2016/0371840 A1* | 12/2016 | Zhou | ...................... | G06F 17/30 |
| 2017/0332054 A1* | 11/2017 | Hallett | .................. | H04N 7/183 |
| 2017/0366940 A1* | 12/2017 | Fan | ...................... | G06F 3/0484 |
| 2018/0035146 A1* | 2/2018 | Goetz | ................ | H04N 21/266 |

\* cited by examiner

DETECTING ILLICIT VIEWING OF PREMIUM CONTENT THROUGH LOCATION DETECTION BY A TELEVISION RECEIVER DEVICE

PRIORITY CLAIM

This application claims priority to U.S. Provisional Patent Application Ser. No. 62/441,136 filed on Dec. 30, 2016. That application is incorporated herein by reference.

TECHNICAL FIELD

The following discussion generally relates to detection of physical location changes by a satellite, cable or other television receiver systems. Location change information may be used, for example, to detect illicit presentation of premium or other content received by a satellite, cable or other television receiver device.

BACKGROUND

Most television viewers are familiar with pay-per-view (PPV) or similar services in which a television subscriber purchases certain programming events for viewing via a private telecast. PPV telecasts are often used to distribute premium content such as movies, sporting events and other entertainment programs that are not included with the purchaser's regular television subscription. Typically, a direct broadcast satellite (DBS), cable or other television subscriber pays an additional fee to the content provider to receive the private telecast of the desired programming.

Typically, content providers have different pricing structures for residential and commercial customers, especially with regard to PPV or other premium content. A bar or restaurant, for example, will typically pay more than a regular residential customer for access to the same programming. This is because a commercial establishment will often present the restricted programming to a larger group of people than a typical residential customer, thereby incurring greater licensing fees to the content owner. Moreover, commercial establishments often impose cover charges or other additional fees to view the premium content, thereby allowing the establishment to profit from the premium content. A boxing match, for example, can attract a large number of paying customers to an establishment that purchases the PPV telecast of the match. As a result, bars, restaurants, gyms and other commercial establishments often have a substantial economic incentive to obtain premium content for viewing by their customers.

On occasion, however, some persons attempt to exploit the difference in residential and commercial pricing of premium content. To avoid paying the higher fees for commercial access to the content, the person instead registers a cable or satellite receiver device to a residential address. After the device is installed, the person obtains premium content at the residential rate. Instead of viewing the content at the residential location, however, the user physically relocates the "home" receiver device to a commercial establishment so that the received telecast can be viewed by the establishment's customers, which can number in the dozens or even hundreds of viewers. This practice takes advantage of the lower residential rate to unfairly prejudice those establishments that pay the appropriate commercial rate. It may also be a violation of civil and/or criminal laws.

It is therefore desirable to detect when a television receiver device is moved from its registered location. These and other desirable features and characteristics will become apparent from the subsequent detailed description and the appended claims, taken in conjunction with the accompanying drawings and this background section.

BRIEF SUMMARY

According to various embodiments, a television set top box (STB) or similar receiver device uses information obtained from a wireless receiver to identify when the device has been moved to a different location. The device may initially obtain a list of wi-fi zones and/or in-range wireless devices that can be quantified and/or stored for later comparison. If the device later finds that the original zones/devices are no longer present or that substantial number of new zones/devices are present, then the device can recognize that it has been moved to a new location. The device may then try to geolocate itself and/or report back to a security service, as appropriate. The box may also disable access to premium (or other) content when a location change is detected, if desired.

Various embodiments provide an automated process executable by a television receiver device to automatically determine a change in location of the television receiver device. The process suitably comprises: initially gathering, by the television receiver device, first wireless network information; storing, by the television receiver device, the first wireless network information; after a period of time has elapsed, the television receiver device gathering second wireless network information; and comparing the first network information to the second network information by the television receiver device and, if the first and second network information are different from each other, the television receiver device indicating that the location of the television receiver device has changed. The wireless network information could include, without limitation, numbers or lists of Wi-Fi zones, numbers or lists of other network devices visible to the television receiver device, and/or other information as appropriate.

Other embodiments provide a video receiver device having a processor, memory and a wireless network interface, wherein the memory stores instructions that, when executed by the processor, perform any of the processes described herein. In one example, a television receiver device comprises a processor, memory and a wireless network interface. The memory stores instructions that, when executed by the processor, perform an automated process to automatically determine a change in location of the television receiver device. In at least one example, the process suitably comprises: initially gathering, by the television receiver device, first wireless network information; storing, by the television receiver device, the first wireless network information; after a period of time has elapsed, the television receiver device gathering second wireless network information; and comparing the first network information to the second network information by the television receiver device and, if the first and second network information are different from each other, the television receiver device indicating that the location of the television receiver device has changed.

Other embodiments relate to server systems for receiving data and/or location change notifications from television receiver devices, as well as various computer-implemented processes executed by such systems.

These and other embodiments, aspects and other features are described in additional detail below.

BRIEF DESCRIPTION OF THE DRAWING FIGURES

Figure 2:
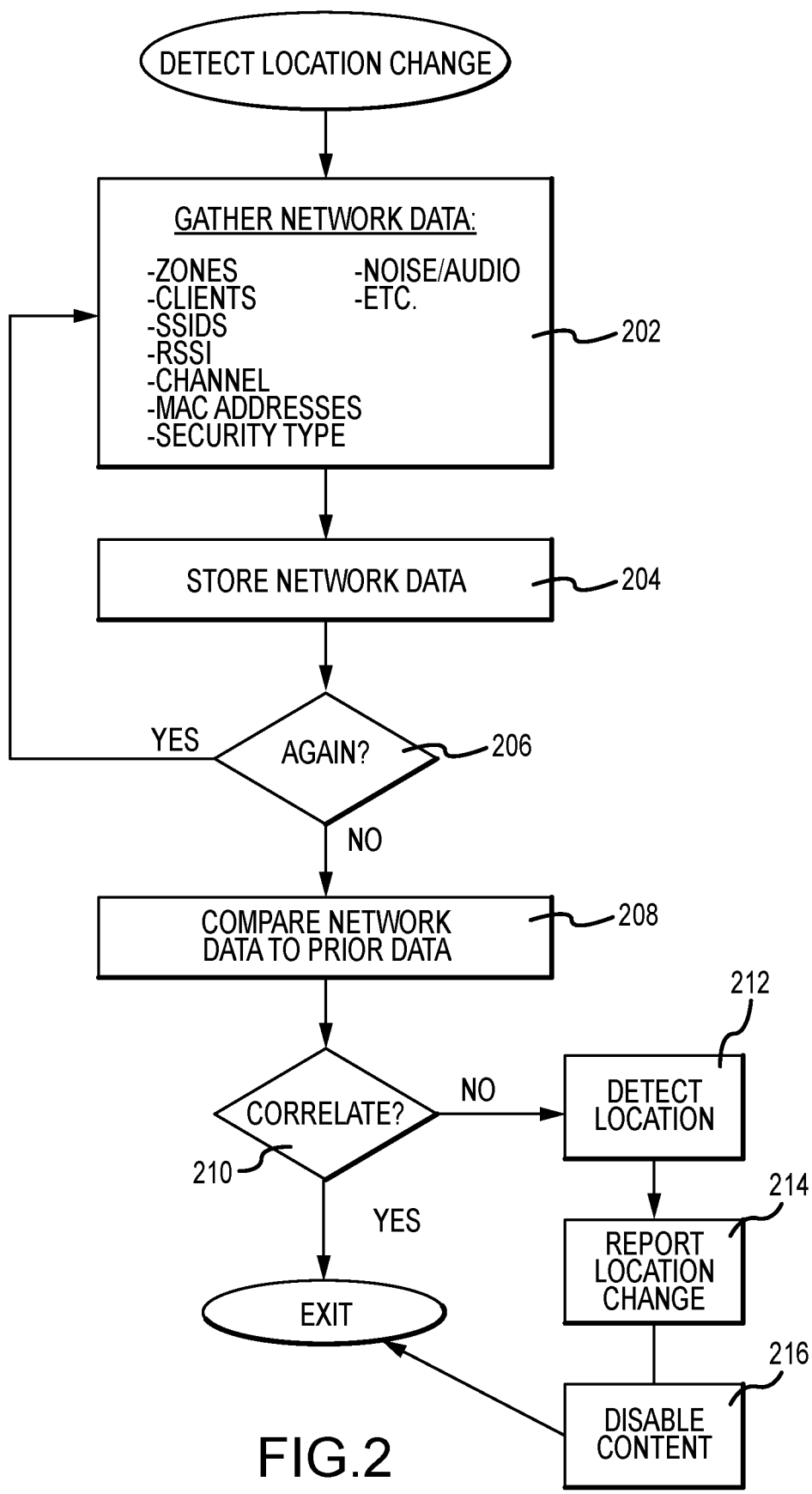

Example embodiments will hereinafter be described in conjunction with the following drawing figures, wherein like numerals denote like elements, and FIG. 1 is a block diagram of an example television receiver system that is able to automatically detect location changes; and FIG. 2 is a flowchart of an example process to detect location changes by a television receiver system.

DETAILED DESCRIPTION

The following detailed description is intended to present several examples that will illustrate the general principles of the invention, which may be implemented in any number of alternate but equivalent embodiments. This discussion is not intended to limit the invention or its uses. Furthermore, there is no intention to be bound by any theory presented in the preceding background or the following detailed description.

According to various embodiments, a set top box (STB) or other television receiver device is able to automatically detect changes in its own physical location by gathering and storing wireless network information at different times, and by monitoring changes in the gathered information over time. If the wireless network conditions change substantially between observations, then it can be readily deduced that the device has been moved from one location to another. If the device suspects that its location has changed, then the change can be reported to a security server (e.g., via a network or telephone connection), or simply recorded for further analysis. The device may also attempt to gather additional information (e.g., geolocation information based upon a GPS signal, network information, and/or other factors as desired), as appropriate. Further embodiments could additionally disable presentation of received content (or at least premium content) until the location issue is resolved (e.g., with a call to customer service or the like). These basic concepts may be expanded, adapted or modified in any number of different ways.

Turning now to the drawings and with initial reference to FIG. 1, a television receiver device 110 is able to gather information 106 about its wireless networking environment and to store such information 106 for later comparison to then-current network conditions. If network information 106 changes substantially between observations, then the device 110 can be ascertained to have moved to a completely different physical location (e.g., from a residential environment to a commercial environment).

Network information can be gleaned from a conventional network interface 113, such as a conventional IEEE 802.11 ("Wi-Fi") interface. Most residential locations will have relatively simple network environments (including just a few to a few dozen zones, each with only a few visible clients). Commercial settings such as bars and restaurants, however, will typically have more zones 130, and substantially more nodes 132 due to the prevalence of network-enabled smartphones carried by the many patrons of the establishment. Moreover, the zones 130 and nodes 132 will be substantially more transient in a public establishment due to the various patrons typically only staying in wireless range for a relatively short time (minutes to hours), in comparison to residential zones 130 and 132, which typically change on a much more infrequent basis. While some variation in residential network conditions may occur over time, the changes are typically much less noticeable than changes that occur on an hourly basis (or even more frequent) in a commercial establishment.

Network information 106 stored by receiver device 110 could include lists of wireless networks 130 and/or network nodes 132 that are visible to the receiver device 110 at any particular time, although the particular network information 106 that is stored will vary from embodiment to embodiment. In the example shown in FIG. 1, receiver 110 maintains a list of wireless LANs 130A-B that are visible, as well as a list of clients 132 that are identified on one or more LANs. Alternate embodiments may store more or less information, recognizing that more information will typically provide a more accurate determination that the location has changed. Other information that could be monitored for changes over time could include, without limitation, any information associated with IEEE 802.11 zones (e.g., zone names, channel numbers, service set identifiers (SSIDs), security type (e.g., WEP, WPA), etc.), media access control (MAC) or other addresses of network nodes, received signal strength indication (RSSI) data, and/or the like. Equivalent embodiments could equivalently track any data obtained from IEEE 802.15 (e.g., BLUETOOTH or similar wireless personal area networks), IEEE 802.16 (WIMAX), and/or any other wireless signals as desired.

While data 106 shown in FIG. 1 includes full lists of zones 130 and nodes 132 that are visible to device 110, other embodiments may simply store the number of zones 130 and/or the number of nodes 132 that are visible. If the device 110 later determines that the number of zones or nodes has changed by a substantial number, this may be sufficient to recognize that the device 110 has moved from a residential environment to a commercial environment where substantially more people are present.

When a location change is identified through changes in network data 106 over time, the receiver device 110 suitably indicates the location change in an appropriate manner. Various embodiments may simply record the data 106 and make a notation in an internal log or the like, but other embodiments may attempt to report the location change to a remotely-located server system 140 or the like. Various embodiments may also disable some or all presentation of received content (e.g., premium content) when a location change is identified.

Server 140 may be contacted via the Internet or another wide area network 145, as appropriate. Other embodiments may instead contact server 140 via a cellular or other telephone modem contained within device 110. Even if the device operator disables WAN access for the device 110, it may nevertheless be possible to transmit a cellular or other telephone message. Other embodiments may attempt to connect to any public or unsecured networks 130 that are identified in data 106, as appropriate, to contact server 140 via WAN 145 as needed. Server 140 may initiate a service call to the location reported by device 110 in some embodiments, whereas other embodiments may record the message in a log or the like, and/or attempt to notify a human operator that a location change has been identified for further investigation. Server 140 may also attempt to locate the device 110 using a geolocation database or the like based upon a dynamic IP address or other information used by the reporting device 110. Other embodiments may operate in any other manner.

Receiver 110 is any device, component, circuitry or logic capable of receiving and processing video programming content. As shown in FIG. 1, receiver 110 includes a receiver interface 112, a controller 113 with appropriate processor 116 and memory 118 resources, and a display interface 114 as appropriate. In various embodiments, receiver 110 is a conventional television receiver (e.g., a set top box or other broadcast, direct broadcast satellite (DBS) and/or cable television receiver) capable of receiving signals via any appropriate cable, DBS, IPTV or other distribution channel 108. Receiver 108 also provides an output signal 115 that can be displayed to the viewer on a television or other display 120. In various embodiments, display 120 is any sort of television or other monitor that is capable of receiving a program signal 115 from a set-top box, decoder or other external receiver 110 as desired.

Network interface 113 is any hardware interface that is capable of establishing wireless communications with any sort of local area networks 130 and/or wide area networks 145. In various embodiments, network interface 113 is a conventional IEEE 802.11 interface to Wi-Fi networks, although other embodiments could be equivalently implemented using any other network standards or protocols as desired. Network interface 113 is capable of gathering network information 106 about zones 130, nodes 132 and/or other network features under the direction of logic 105 executed by controller 113.

Receiver interface 112 is any hardware, firmware and/or software interface capable of receiving programming content. In various embodiments, receiver interface implements a demodulator/decoder feature for receiving and demodulating digital television programming over a broadcast, satellite, and/or cable programming link. In other embodiments, receiver interface 112 may be combined with a conventional network interface 113 to a digital network such as the Internet, or any local area, telephone and/or other network having access to the Internet.

The example television receiver 110 illustrated in FIG. 1 also includes a storage medium 119, as appropriate. Storage medium 119 may be implemented as additional memory, as a disk drive, or in any other manner. Many embodiments may provide a digital video recorder (DVR) or other recording feature that allows content to be stored in storage medium 119 for later viewing. Storage medium 119 may also provide storage for network information 106, as appropriate. Although FIG. 1 network information 106 stored within storage medium 119, equivalent embodiments could store this data in memory 118, and/or in any other memory, disk or other storage medium available to receiver 110.

Controller 113 is any sort of control logic or the like that interacts with receiver interface 112 and display interface 114 to output imagery to the viewer on display 120. Controller 113 also controls the reception, storage and processing of video content via receiver interface 112. To that end, controller 113 suitably directs the detection of location changes by executing appropriate software, firmware or other logic 105. Logic 105 may be stored in secure or other memory 118, as appropriate, for execution by processor 116. Additional detail about location detection is provided below with respect to FIG. 2.

In various embodiments, controller 113 may be implemented using any sort of microprocessor, microcontroller, digital signal processor or other processor 116 capable of directing the actions and processes of receiver 110. Typically, processor 116 will be associated with any sort of memory 118, such as any sort of static, dynamic, flash or other memory capable of storing programming instructions and/or data for processing by processor 116. In various embodiments, receiver 110 is based upon a "system on chip" (SoC) implementation that incorporates a hybrid microcontroller 116 with memory 118, input/output and/or other features to perform the various signal processing and other actions of receiver 110. Various SoC and other integrated hardware implementations are available from Texas Instruments, Conexant Systems, Broadcom Inc., NXP/Qualcomm and/or many other suppliers as appropriate. Other embodiments may implement processor 116 and/or memory 118 using any sort of application specific integrated circuit (ASIC) or the like. Still other embodiments may implement processor 116 and/or the other features of receiver 110 with any number of discrete and/or integrated processing components (e.g., any sort of microprocessor or microcontroller), memories 118, input/output features and/or other features as desired.

Display interface 114 is any physical and/or logical interface to display 120. As noted above, in some implementations receiver 110 and display 120 are provided in an integrated product (e.g., a conventional television). In other embodiments wherein receiver 110 provides video output signals 115 to an external display 104, such signals 115 may be provided in any compatible format. In embodiments wherein display 120 is a conventional television, for example, display interface 114 may provide video output signals 115 in any conventional format, such as component video, composite video, S-video, High-Definition Multimedia Interface (HDMI, e.g., any version of the CEA-861 standards), Digital Visual Interface (DVI), IEEE 1394, universal serial bus (USB) and/or any other formats as desired.

Display 120 is any sort of television, monitor and/or other display capable of presenting video imagery 122 to a viewer. In various embodiments, display 120 operates in conjunction with receiver 110 to generate video imagery 122 in any manner. Other embodiments may combine the functions and components of receiver 110 and display 120 into a common housing, as in a conventional television with a built-in tuner or other receiver. In the example illustrated in FIG. 1, imagery 122 is generated with caption text 124 that is provided within timed text 103, as described by format data 105.

In operation, then, receiver device 110 suitably obtains network information 106 via network interface 113 on any temporal basis, and stores the information gathered for subsequent analysis. If the network conditions for the location of device 110 change substantially over time, then the device 110 can be determined to have been moved to a different physical location. This movement can be identified or reported, and any additional reactions to the new location can be performed as desired.

With reference now to FIG. 2, an example process 200 for automatically identifying a change in the location of a television receiver device 110 suitably includes the broad functions of gathering network data (function 202), storing the network data for later analysis (function 204), repeating the gathering function at a later time (function 206) and comparing the subsequently-gathered data to the previous data (function 208). If substantial differences exist between the current and prior network conditions (function 210), then a location change can be identified (function 214) and/or further actions can be taken (function 216) as desired. In some embodiments, the various functions of process 200 may be carried out by programmed logic 106 stored in memory 118 and executed by processor 116 of device 110. Equivalent embodiments could supply the gathered network data 106 to a cloud or other remote server (e.g., server 140) for remote processing, if desired, although this could potentially be defeated by simply preventing device 110 from accessing the WAN 145 to contact server 140. Nevertheless, some embodiments could perform some or all of the functions shown in FIG. 2 using different processing hardware, as desired.

Different embodiments could track any number of network parameters over time to identify location changes. To that end, device 110 suitably gathers information 106 (function 202) at any regular or irregular time interval, in response to instructions from server 140 or the like, and/or upon the occurrence of certain events. In various embodiments, network data is gathered 202 at power up (since device 110 will typically need to be powered down to be transported), upon presentation of premium content, and/or at any other appropriate times. Often, the customer's first setup of device 110 will be performed by a technician or other trusted service provider, so the initial network data 106 can often be presumed to be correct for the approved location of device 110. If subsequent changes from the initial data 106 are identified, this may be highly indicative of a location change. Hence, it is typically desirable to gather network information 106 during the initial activation of the device, since this may be one of the most reliable times to gather location-based data.

As noted above, the particular data 106 that is gathered and stored by device 110 may vary substantially from embodiment to embodiment. In some implementations, merely keeping track of the numbers of zones 130 and/or nodes 132 may be sufficient. Other embodiments may wish to track zone names, SSIDs, security parameters, etc. MAC addresses or names of clients 132 could also be retained and/or correlated with their respective network zones, if desired. Still other embodiments may attempt to recognize more persistent nodes (e.g., printers, file servers and the like) that are more likely to be present at later dates and times to verify that those nodes 132 are indeed present upon subsequent checks.

Network information 106 may be supplemented with other data as desired. If a device 110 has a GPS or other location tracking capability, then this location information may be stored with data 106. Other embodiments may use geolocation based upon IP address, SSID recognition and/or other factors to locate device 110 with at least some reliability. Other environmental effects may be additionally or alternately measured. Noise levels, for example, could be measured using a microphone of device 110 and quantified using conventional signal analysis. Noise levels may be useful in absolute terms (e.g., commercial settings are often much noisier than residential settings) and/or in relative terms (e.g., substantially changing noise levels could indicate that the device has been moved to a noisier, and therefore more crowded, environment). Other forms of proximity sensing such as RFID scanning, BLUETOOTH scanning or other forms of analysis could be additional or equivalently used to supplement network information 106, as desired.

Network information 106 may be stored for subsequent analysis (function 204). As noted above, data 106 may be stored in storage 119, if desired, or in memory 118 or the like. Data 106 may also be stored with a remote server 140, if desired, for additional security. In various embodiments, it may be desirable to encrypt or at least obscure data 106 in storage so that it is not tampered with or replaced.

Gathering of information 106 may be repeated on any temporal basis (function 206). As noted previously, information 106 may be retrieved on startup, on a regular time basis (e.g., daily or weekly), in response to an instruction from server 140, just prior to presentation of premium content, and/or on any other basis.

Information 106 is analyzed in any appropriate manner (function 208). In various embodiments, the numbers of zones 130 and/or observed nodes 132 between two observations 202 are compared to each other. If substantial differences exist (function 210), then a location change can be indicated. "Substantial" in this context recognizes that the network information 106 will most likely change somewhat over time as certain nodes 132 and/or zones 130 enter or leave service. Function 208 will therefore consider a predetermined level of difference that will be tolerated without flagging a location change. This pre-determined level can be determined from trial and error, experimentation or other analysis, but it is not necessary that the compared datasets 106 exactly match; to the contrary, it is likely that perfect matches will be relatively infrequent. The particular parameters will vary from embodiment to embodiment, but it is possible that the numbers of observed nodes 132 and/or zones 130 may vary by an order of magnitude or more when the device 110 is moved between residential and commercial settings.

Once again, the amount of comparison performed will depend upon the particular information 106 that is tracked. Various embodiments may use multiple stages of analysis, as desired. If initial comparisons (e.g., zone or node numbers) indicate a change, for example, then it may be beneficial to perform additional comparisons (e.g., comparing zone names or SSIDs, looking for persistent nodes, etc.) to check if the location has changed. Various embodiments could improve this process by identifying zones and/or nodes that are present through multiple scans, so their sudden absence may be particularly indicative of a location change. Other embodiments may perform a more thorough analysis of node or zone lists in information 106 as part of comparison 208 to ensure a more thorough analysis.

When a change in location is identified, the device 110 may, in some embodiments, attempt to determine its new location in geographic or other terms. If the device has a GPS receiver and location signals are receivable, for example, a new location can be readily determined. If the device 110 has access to a WAN 145, it may be possible to contact a geolocation service on the network that can identify the physical location of the device 110 (or at least a logical location of device 110 within the network 145) with some particularity. If a device 110 is able to obtain an IP address from a router or gateway device, for example, a geolocation server can typically identify the approximate location of the device 110 based upon the IP address of the device 110 and/or the address of the assigning router if the device 110 is behind a network address translation (NAT) device (or the like).

A change in location may be reported in any manner (function 214). In various embodiments, the device 110 records the location change in a locally-stored log or other record. Further embodiments could attempt to provide a notification to a remote service 140, if network connectivity can be established. As noted above, service 140 may be reachable via a cellular or other modem if network connectivity is blocked or otherwise unavailable. The notification sent from the device 110 to service 140 will typically identify the device 110. Ideally, any location information (especially detected information about the new location) can be sent as well, thereby allowing the service 140 to recognize offending locations. Network information 106 may also be sent for evidentiary, backup or other purposes. Even if location information is not available, however, transmitting the device identifier will allow service 140 to recognize the offending device 110, thereby allowing an administrator to take further action. In some implementations, notification to service 140 may not be possible when the location change is immediately recognized. If the device 110 is prevented or otherwise unable to contact server 140, it may be necessary to delay the notification until network contact with server 140 is re-established at a later date or time.

Other actions may be taken as desired. Various embodiments may be able to disable presentation of some or all received content when a location change is detected (function 216). In such embodiments, device 110 may present imagery requesting that the customer contact customer service, or to take any other appropriate action. If the location change can be verified, then presentation can be re-enabled. Note that disabling access to premium content (particularly if the user has paid for such content) may be inconvenient with the user, so various embodiments may wish to perform additional checks on the network data 106 or other information to reduce the likelihood of false positive results. Such additional measures could include performing a more detailed comparison of zones 130, nodes 132 or other features, and/or additional checks of other available data (e.g., noise levels, geolocation, etc.) to ensure that the location change has occurred prior to disabling the content, as appropriate.

Various embodiments are therefore able to automatically detect changes in the location of a set top box or other television receiver device 110 through repeated gathering of network information. If substantial changes to the information are observed, then the device 110 can be determined to have been moved to a different physical location. Because the location change is detected on-board the device itself without the need for access to outside services, a reliable yet effective mechanism for detecting unauthorized movement of the device is provided. These basic concepts may be enhanced or modified in any number of ways across any number of alternate but equivalent embodiments.

As used herein, the word "exemplary" means "serving as an example, instance, or illustration." Any implementation described herein as "exemplary" is not necessarily to be construed as preferred or advantageous over other implementations, but rather as one example that may have any number of alternate but equivalent implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. An automated process executable by a television receiver device having a network interface to a digital local area network to automatically determine a change in location of the television receiver device, the process comprising:

initially gathering, by the television receiver device via the network interface, first wireless network information describing a first plurality of other nodes connected to the same digital local area network in which the television receiver device is operating;

storing, by the television receiver device, the first wireless network information in a digital storage of the television receiver device;

after a period of time has elapsed, the television receiver device gathering second wireless network information via the network interface, the second wireless network information describing a second plurality of other nodes connected to the same digital local area network which the television receiver is operating after the period of time has elapsed; and comparing the first network information to the second network information by the television receiver device and, if the first and second pluralities of other nodes are substantially different from each other, the television receiver device indicating that the television receiver has moved to a different digital local area network, thereby indicating that the physical location of the television receiver device has changed, wherein each of the other nodes of the first and second plurality of other nodes is a different network device that is identifiable to the television receiver device by a different network address on the digital local area network.

2. The process of claim 1 wherein the television receiver device comprises a television receiver interface that is separate from the network interface and that has a broadcast area, and wherein the comparing comprises the television receiver device determining that the physical location of the television receiver device has changed from a residential location to a new location that is a commercial establishment.

3. The process of claim 2 wherein the television receiver device comprises a digital broadcast satellite (DBS) interface that is separate from the network interface and that receives DBS television broadcasts, and wherein the broadcast area is a satellite footprint of the DBS television broadcasts.

4. The process of claim 2 wherein the television receiver interface is a digital broadcast satellite (DBS) interface, and wherein the network interface is an IEEE 802.11 interface to wireless local area data networks.

5. The process of claim 4 further comprising the television receiver device disabling access to at least some television program content received via the DBS interface if the television receiver device indicates that the location of the television receiver device has changed.

6. The process of claim 1 wherein the indicating comprises sending, by the television receiver device, a location change message to a server system.

7. The process of claim 6 wherein the location change message comprises an identifier of the television receiver device.

8. The process of claim 7 further comprising the television receiver device determining its location if the television receiver device indicates that the location of the television receiver device has changed.

9. The process of claim 8 wherein the location change message comprises information about the determined location of the television receiver device.

10. A television receiver device having a processor, a digital storage, a television receiver interface and a wireless network interface to a digital local area network, wherein the television receiver interface is separate from the wireless network interface and receives broadcast television content within a broadcast area, wherein the digital storage stores instructions that, when executed by the processor, perform an automated process to automatically determine a change in a physical location of the television receiver device, the process comprising:

initially gathering, by the television receiver device via the wireless network interface, first wireless network information describing a first plurality of other devices connected to the same digital local area network in which the television receiver device is operating;

storing, by the television receiver device, the first wireless network information in the digital storage of the television receiver device;

after a period of time has elapsed, the television receiver device gathering second wireless network information via the wireless network interface, the second wireless network information describing a second plurality of other devices connected to the same digital local area network in which the television receiver device is operating; and comparing the first network information to the second network information by the television receiver device and, if the first and second network information are substantially different from each other, the television receiver device indicating that the television receiver device has been moved from a residential location to a commercial establishment located at a different physical location, and responsively and automatically disabling access to at least some of the broadcast television content received via the television receiver interface, wherein each of the other nodes of the first and second plurality of other nodes is a different network device that is identifiable to the television receiver device by a different network address on the digital local area network.

11. The television receiver device of claim 10 wherein the first and second wireless network information each comprise lists of network devices that are identifiable by the television receiver device.

12. The television receiver device of claim 10 wherein the television receiver interface is a digital broadcast satellite (DBS) interface.

13. The television receiver device of claim 10 wherein the indicating comprises sending, by the television receiver device, a location change message to a server system that comprises an identifier of the television receiver device.

14. The television receiver device of claim 13 wherein the television receiver device subsequently determines its precise location if the television receiver device indicates that the location of the television receiver device has changed, and wherein the location change message further comprises information about the determined precise location of the television receiver device.

15. A television receiver device comprising a processor, digital storage, a television receiver interface, and a wireless network interface to a local area network, wherein the digital storage stores instructions that, when executed by the processor, perform an automated process to automatically determine a change in a physical location of the television receiver device, the process comprising:

initially gathering, by the television receiver device via the network interface, first wireless network information comprising a plurality of digital identifiers uniquely identifying other devices connected to the same the local area network in which the television receiver device is operating;

storing, by the television receiver device, the first wireless network information in a digital storage of the television receiver device;

in response to an instruction received from a remote service via the digital network after a period of time has elapsed, the television receiver device gathering second wireless network information via the wireless network interface, the second wireless network information comprising a second plurality of digital identifiers that uniquely identify other devices connected to the same local area network in which the television receiver is operating; and comparing the first network information to the second network information by the television receiver device and, if the first and second network information are substantially different from each other, the television receiver device indicating that the television receiver has been moved from a residential location to a different physical location that is a commercial establishment, and responsively and automatically disabling access to at least some of program content received via the television receiver interface, wherein each of the other nodes of the first and second plurality of other nodes is a different network device that is identifiable to the television receiver device by a different network address on the digital local area network.

16. The television receiver device of claim 15 wherein the local area network is an IEEE 802 network.

17. The television receiver device of claim 15 wherein the television receiver interface is a digital broadcast satellite (DBS) interface that receives the program content.

18. The television receiver device of claim 15 wherein the television receiver interface is a cable television interface that receives the program content.

* * * * *